(12) United States Patent
Kitahata et al.

(10) Patent No.: US 6,209,409 B1
(45) Date of Patent: Apr. 3, 2001

(54) HOUSING STRUCTURE FOR POWER STEERING SYSTEM

(75) Inventors: Kouji Kitahata, Osaka; Osamu Miyazaki, Kashihara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/151,206

(22) Filed: Sep. 11, 1998

(30) Foreign Application Priority Data

Sep. 19, 1997 (JP) .................................................. 9-273559

(51) Int. Cl.$^7$ ...................................................... B62D 5/10
(52) U.S. Cl. ...................................... 74/388 PS; 74/606 R
(58) Field of Search ........................... 74/388 PS, 498, 74/606 R; 180/417, 428; 403/357, 404

(56) References Cited

U.S. PATENT DOCUMENTS

| 3,779,592 | * | 12/1973 | Golze et al. | 293/122 |
| 4,478,915 | * | 10/1984 | Poss et al. | 403/404 |
| 4,608,876 | * | 9/1986 | Rosell | 74/388 PS |
| 5,020,934 | * | 6/1991 | Floren et al. | 403/404 |
| 5,735,718 | * | 4/1998 | Ekwall | 440/83 |

FOREIGN PATENT DOCUMENTS

| 2 623 933 | * | 6/1989 | (FR) . |
| 2 202 502 | | 9/1988 | (GB) . |
| 64-31986 | * | 2/1989 | (JP) . |
| 4-5102 | * | 1/1992 | (JP) . |

OTHER PUBLICATIONS

Marks' Standard Handbook for Mechanical Engineers, tenth edition, McGraw–Hill, p. 6–99, Dec. 1996.*
Patent Abstracts of Japan, vol. 004, No. 123 (M–029), Aug. 30, 1980.

* cited by examiner

Primary Examiner—David A. Bucci
Assistant Examiner—William C Joyce
(74) Attorney, Agent, or Firm—Jacobson, Price, Holman & Stern, PLLC

(57) ABSTRACT

For prevention of direct contact of a pinion housing formed of magnesium alloy with a metal of a different type, there is provided an insulating portion formed by a chromate treatment and a painting coating.

1 Claim, 4 Drawing Sheets

HOUSING STRUCTURE FOR POWER STEERING SYSTEM

FIELD OF THE INVENTION

The present invention relates to a housing structure for power steering system and more particularly, to a housing structure for power steering system reduced in weight and subjected to a corrosion resisting treatment.

DESCRIPTION OF THE PRIOR ART

Heretofore, there have been proposed power steering systems which have accomplished weight reduction by, for example, replacing iron with aluminum as a material for a pinion housing (see, for example, Japanese Unexamined Patent Publications Nos. 55(1980)-79756 and 63(1988)-235168). Additionally, studies have been made on the adoption of magnesium alloys in pursuit of further weight reduction of the system.

Unfortunately, however, the pinion housing and the like of the power steering system are parts included in a so-called automotive foot portion which are exposed to rain blowing therein and water splashed up from the road. In most cases, such water is aqueous electrolytic solution containing impurities. For instance, in a vehicle traveling on a road near the sea, the pinion housing and the like may be exposed to water containing salt or the aqueous electrolytic solution. Hereupon, it is to be noted that the housing, which is formed of magnesium alloy, is in contact with a bolt, a cylinder tube or the like which is formed of a different type of metal (e.g., iron or the like) from the magnesium alloy. When a contact portion of the housing with the bolt etc. is exposed to the aqueous electrolytic solution, a local cell is established at the contact portion. Magnesium is thereby ionized and dissolved, so that the corrosion of the housing occurs.

That is, the magnesium alloy is useful for forming a lightweight housing, but on the other hand, it causes the corrosion of the housing.

OBJECT AND SUMMARY OF THE INVENTION

An object of the present invention is to reduce the weight of the housing and to prevent the corrosion of the housing.

A steering gear housing included in a housing structure for power steering system of the present invention, comprises: a valve housing formed of one of metal and resin material; a pinion housing formed of magnesium alloy; a metal bolt for fastening the valve housing and the pinion housing to each other; and an insulating portion interposed in a joint portion between the pinion housing and a metal member of any member adjacent thereto including the valve housing and the metal bolt, the metal member being formed of a different type of metal from which the pinion housing is formed of.

The housing of such a structure is reduced in weight by the use of the magnesium alloy and protected against the corrosion thereof by virtue of presence of the insulating portion.

In the above housing structure, the insulating portion may be formed on a surface of the metal member by applying thereto at least one of abase treatment layer formed by base treatment and a paint coating layer as a top coat layer formed by painting. In this case, presence of at least one of the base treatment layer and the paint coating layer prevents the housing from being corroded. Also, presence of both the base treatment layer and the paint coating layer positively prevents the housing from being corroded. Thus, the housing can be protected against the corrosion thereof over an extended period of time.

Further, in the above housing structure, the valve housing may be formed of the resin material. The pinion housing may be provided with a sleeve-like projection which extends from a female-screw portion of the pinion housing and which is fitted in the valve housing to define an insert for the valve housing for insertion of the metal bolt. In this case, the insert is integrally formed with the pinion housing, thereby eliminating fear for the corrosion due to contact of the insert with the pinion housing.

Further, in the above housing structure, the valve housing formed of the resin material may include the insert formed of iron metal for insertion of the metal bolt, while a sealing member of a rubber or synthetic resin material may be interposed between the insertion port and the pinion housing. In this case, the sealing member eliminates direct contact between the insert and the pinion housing, thereby preventing occurrence of corrosion.

Further, in the above housing structure, the valve housing may be formed of the magnesium alloy. Resin coated sealing members may be interposed between the valve housing and the metal bolt. In this case, the valve housing and pinion housing are formed of the same type of metal so that contact therebetween causes no corrosion. Also, direct contact of the valve housing with the metal bolt is prevented by the sealing member. Therefore, these elements eliminate occurrence of corrosion. Further, in this housing structure, the pinion housing may include the female-screw portion, in which sealing agent is filled, to have the metal bolt insert therein and having a hole extending downwardly through the pinion housing from a bottom of the female-screw portion. In this case, the sealing agent is extruded from the hole by inserting the metal bolt in the female-screw portion, thereby preventing salt water or the like from entering the female-screw portion. Occurrence of corrosion is thus prevented.

DESCRIPTION OF THE PREFERRED EMBODIMENTS

Figure 1:
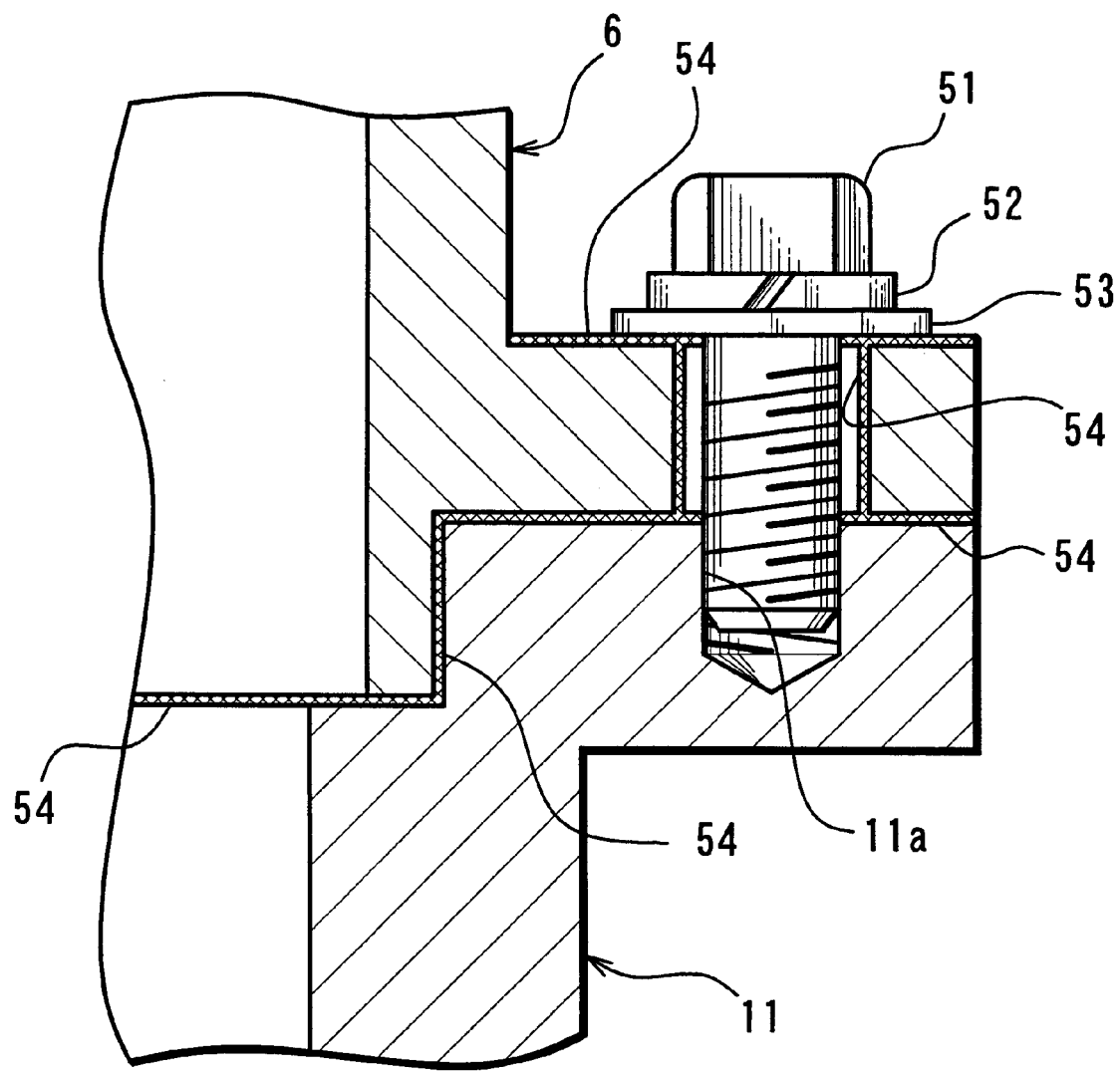
FIG. 1 is a fragmentary sectional view showing an essential portion of a valve housing structure for use in a power steering system in a first embodiment of the present invention.

Hereafter, preferred embodiments of housing structure for a power steering system will be described with reference to the accompanying drawings. FIG. 1 to FIG. 5 are fragmentary sectional views showing essential portions of housing structures according to the preferred embodiments. FIG. 6 is a sectional view showing an overall construction of the power steering system that is common to the respective embodiments.

Referring to FIG. 6, the overall construction of the power steering system will be described. The power steering system 1 is a rack and pinion type hydraulic power steering system in which a valve assembly 1A, a rack and pinion assembly 1B and a hydraulic cylinder assembly 1C are interconnected. The power steering system is arranged such that a hydraulic assisting steering force generated in response to operation of a steering wheel is added to a steering force applied from an output shaft 4 to a rack 8. A valve housing 6 as a casing of the valve assembly 1A, a pinion housing 11 as a casing of the rack and pinion assembly 1B and a cylinder tube 19 as a casing of the hydraulic cylinder assembly 1C are discretely formed beforehand and coupled to each other.

The valve assembly 1A includes a rotary valve mechanism, through a central portion of which extended are an input shaft 2 coupled to the steering wheel (not shown) and a torsion bar 3. The input shaft 2 and the torsion bar 3 are secured to each other only at one of axial ends thereof (upper ends thereof (not shown)). A lower end of the torsion bar 3 is connected to the output shaft 4 such that the steering force (rotation torque) applied to the input shaft 2 is transmitted to the output shaft 4 via the torsion bar 3. Therefore, the input shaft 2 (as a rotary member) is adapted for rotation relative to the output shaft 4 (similarly as the rotary member) by a quantity of torsion of the torsion bar 3 that depends on a steering resistance.

The valve assembly 1A is provided on its outer circumference with an intake port 36, a discharge port 40, a first connection port 32 (for connection of pipe) and a second connection port 34 (for connection of pipe).

The intake port 36 is connected to a pump 37 via a pipe 73. The pump 37 serves to suck up oil from a tank 41 for feeding the oil to the valve assembly 1A at a predetermined pressure. The discharge port 40 communicates with the tank 41 via a pipe 74 so that the oil discharged from the valve assembly 1A is returned to the tank 41.

The output shaft 4 is formed with a pinion 7 at a lower end portion thereof, and the pinion 7 is engaged with the rack 8 which is held in the rack and pinion assembly 1B. The pinion housing 11 holds the output shaft 4 by means of a ball bearing 12 and a needle bearing 13.

Laterally opposite ends of the rack 8 are coupled to steered wheels (not shown) which are steered in accordance with lateral movement of the rack 8. The hydraulic cylinder assembly 1C continuous to the rack and pinion assembly 1B is an actuator for providing the assisting steering force, and piston action of the actuator assists the lateral movement of the rack 8.

The hydraulic cylinder assembly 1C is essentially composed of the cylinder tube 19 and a piston 20 integrally formed with the rack 8. The piston 20 partitions an interior of the cylinder tube 19, thus defining a pair of oil chambers 21 and 22. At an end of the oil chamber 21, an oil seal 45 is interposed between the rack 8 and the cylinder tube 19. On the other hand, a rack bushing 46 is interposed between the rack 8 and the cylinder tube 19 at an end of the oil chamber 22. An oil seal 47 is interposed between the rack bushing 46 and the rack 8, and also an 0-ring 48 is interposed between the rack bushing 46 and the cylinder tube 19. The rack bushing 46 is secured to the cylinder tube 19 by means of a snap ring 49.

On an outer circumference of the cylinder tube 19, connection ports 75 and 76 are disposed in corresponding relation with the oil chambers 21 and 22, respectively. The connection ports 75 and 76 are respectively connected to the connection ports 34 and 32 of the valve assembly 1A via pipes 72 and 71.

Next, the structures of the valve housing 6 and the pinion housing 11 are described in detail with reference to FIG. 1. It is to be noted here that FIG. 1 is a fragmentary sectional view showing in detail a construction of a portion indicated by "A" in FIG. 6 which illustrates the housing structure according to a first embodiment.

Now referring to FIG. 1, the valve housing 6 is formed of iron metal, whereas the pinion housing 11 is formed of magnesium alloy for weight reduction. The valve housing 6 and the pinion housing 11 are fastened to each other by engaging a bolt 51 (of iron metal) with a female-screw portion 11a in the pinion housing 11, via a spring washer 52 (of iron metal) and a washer 53 (of iron metal). The valve housing 6 and the pinion housing 11 thus combined constitute a steering gear housing as a whole.

An outer surface of the valve housing 6 is subjected to an ordinary coating processing using an epoxy-base paint. An entire surface of the pinion housing 11 is subjected to a chromate treatment for magnesium alloy, as a base treatment. A base treatment layer formed by this chromate treatment has properties of insulation in addition to corrosion resistance.

On the other hand, the bolt 51, the spring washer 52 and the washer 53 are subjected to a chromate treatment for iron metal, as the base treatment, thereby to form thereon a base treatment layer L1. This base treatment layer has also properties of insulation in addition to corrosion resistance. Further, the bolt 51, the spring washer 52 and the washer 53 are subjected to a coating processing by applying epoxy-base paint on each base treatment layer L2, thereby to form a paint coating layer.

The above-mentioned base treatment layers and the paint coating layer define an insulating portion interposed between the pinion housing 11 and the bolt 51.

The chromate treatment for the pinion housing 11 is typically a shielding chromic acid treatment process equivalent to JIS Type-II MX-2 or a dichromate treatment process equivalent to JIS Type-III MX-3. Ordinary, zinc plating precedes the chromate treatment for iron metal. A direct contact is thus prevented between the pinion housing 11 formed of the magnesium alloy and the valve housing 6, the bolt 51, the spring washer 52 and the washer 53 which are formed of a different type of metal from which the pinion housing is formed of.

In addition, an insulating layer 54 is formed on the valve housing 6 and/or the pinion housing 11 by applying a paint to at least each place where the valve housing 6 or the pinion housing 11 will be joined with or may be in contact with another member. A rubber-base paint or an epoxy-base paint is used for forming the insulating layer 54, which has a thickness of 15 to 20 μm.

The above-mentioned base treatment layer on the pinion housing 11, the epoxy-base paint on the valve housing 6 and particularly the insulation layer 54 define an insulating portion interposed between the pinion housing 11 and the valve housing 6.

The insulating portions serve to suppress transfer of electrons between the members, thereby preventing the occurrence of corrosion of the housings.

Incidentally, it is desirable for enhancement of insulation between the pinion housing 11 and the bolt 51 to form the insulating layer 54 on an internal surface of the female-screw portion 11a too.

To examine an effect of the aforementioned corrosion resisting treatment, a salt water spray test according to JIS-Z2371 was conducted on an untreated article A without any corrosion resisting treatment, a chromate-treated article B, and a chromate-treated and paint-coated article C obtained by further forming the insulating layer 54 on the article B. According to the observation in the test, rust was developed on the untreated article A after a lapse of about 4 hours from the start of the test. On the other hand, rust was developed on the chromate-treated article B after a lapse of about 24 hours from the rust development on the untreated article A (after a lapse of 28 hours from the start of the test). Further, rust was developed on a paint-coated portion of the chromate-treated and paint-coated article C after a lapse of about 452 hours from the rust development on the chromate-treated article B (after a lapse of 480 hours from the start of the test).

This corroborates that the chromate-treated article B presents corrosion resistance about 7 times (28/4) greater than the untreated article A, whereas the chromate-treated and paint-coated article C presents corrosion resistance about 120 times (480/4) greater than the untreated article A.

It was further corroborated that the chromate-treated article B and the chromate-treated and paint-coated article C present greater effect of preventing damage from physical impact such as of a stone piece hitting thereupon, as compared with the untreated article A. That is, these articles offer increased pitting resistance as a spillover effect.

Figure 2:
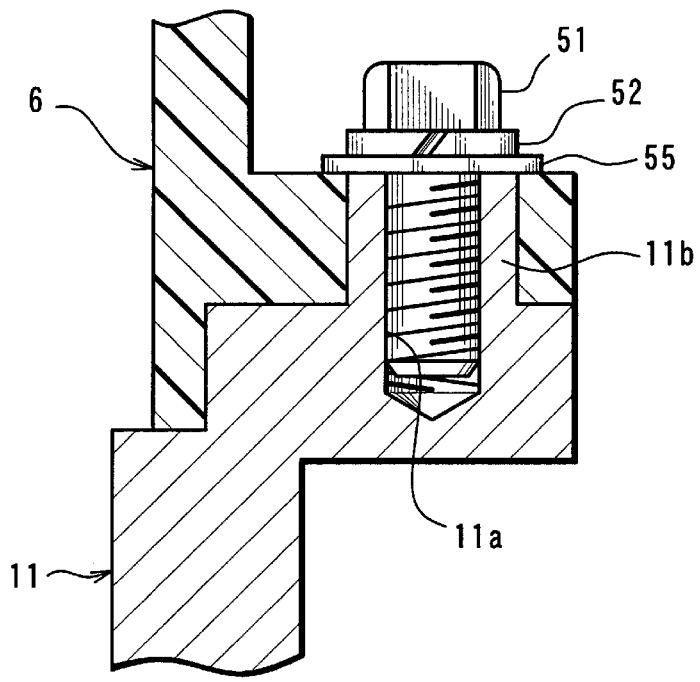
FIG. 2 is a fragmentary sectional view showing an essential portion of a valve housing structure for use in the power steering system in a second embodiment of the present invention.

FIG. 2 is a fragmentary sectional view showing a housing structure according to a second embodiment. Referring to the figure, the valve housing 6 is formed of resin material, whereas the pinion housing 11 is formed of magnesium alloy. The female-screw portion 11a of the pinion housing 11 is projected into the valve housing 6 to define a sleeve-like projection 11b. The projection 11b is fitted in the valve housing 6 so as to serve as an insert (inserted metal) mounted in the resin valve housing 6. The bolt 51 and the spring washer 52 are formed of iron metal and subjected to the chromate treatment and paint coating processing similarly to the first embodiment hereof. The washer 55 is formed of resin material, serving to hold the valve housing 6 on the pinion housing 11.

In the above construction, the valve housing 6 and the pinion housing 11 are in contact with each other, but the contact does not cause the corrosion of the pinion housing 11 because the valve housing 6 is formed of the resin material. As to the bolt 51 and the pinion housing 11, the bolt 51 is subjected to the chromate treatment and paint coating processing for insulation, thereby forming the base treatment layer L1 and the paint coating layer L2 for preventing occurrence of corrosion. The spring washer 52 is kept out of direct contact with the pinion housing 11 by the washer 55 as an insulating portion interposed therebetween.

Figure 3:
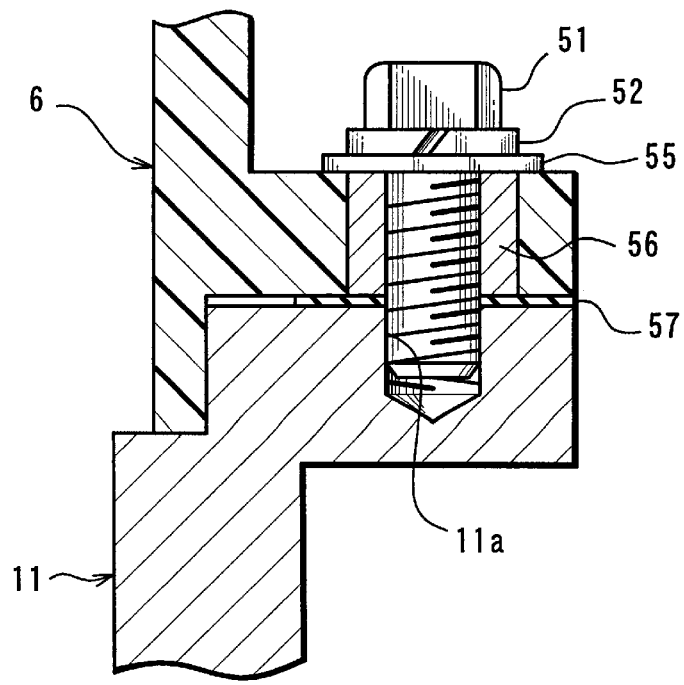
FIG. 3 is a fragmentary sectional view showing an essential portion of a valve housing structure for use in the power steering system in a third embodiment of the present invention.

FIG. 3 is a fragmentary sectional view showing a housing structure according to a third embodiment. Referring to the figure, the valve housing 6 is formed of resin material, whereas the pinion housing 11 is formed of magnesium alloy. The entire surface of the pinion housing 11 is subjected to the chromate treatment or a combination of the chromate treatment and paint coating processing. An insert 56 formed of iron metal is fitted in the valve housing 6, and the insert 56 allows the bolt 51 to insert therein. The bolt 51, the spring washer 52 and the washer 55 are the same with those of the second embodiment hereof. The bolt 51 is engaged with the female-screw portion 11a of the pinion housing 11. Interposed between the insert 56 and the pinion housing 11 is a sealing member 57 which is formed of rubber or synthetic resin material or composed of a metal piece having a surface thereof coated with a fluorocarbon paint such as composed of polytetrafluoroethylene or the like.

In the above construction, the sealing member 57 is interposed between the insert 56 and the pinion housing 11, thereby keeping the both out of direct contact with each other and hence, there occurs no corrosion. Since the valve housing 6 is formed of the resin material, contact of the valve housing 6 with the pinion housing 11 does not cause the corrosion of the pinion housing 11. As to the bolt 51 and the pinion housing 11, the bolt 51 is subjected to the aforementioned combination of the chromate treatment and paint coating processing for forming the layers L1 and L2 for insulation. This is effective to prevent the occurrence of corrosion.

Figure 4:
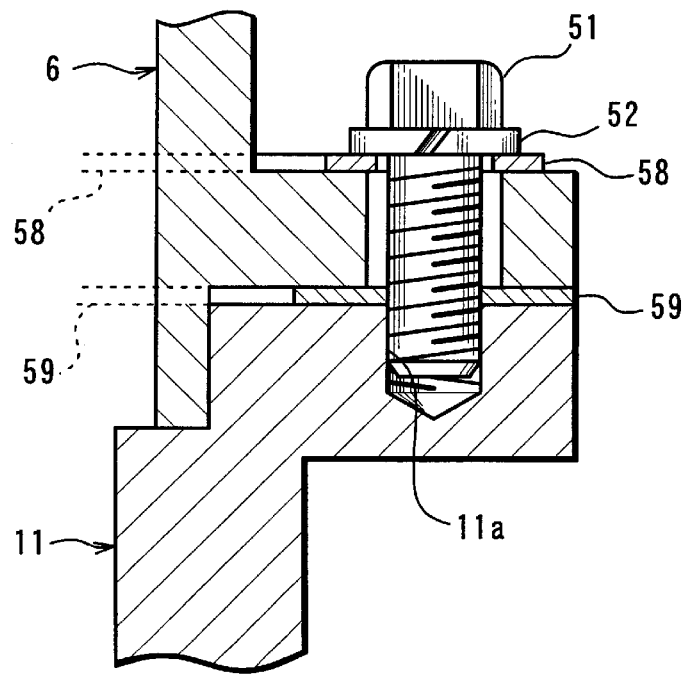
FIG. 4 is a fragmentary sectional view showing an essential portion of a valve housing structure for use in the power steering system in a fourth embodiment of the present invention.

FIG. 4 is a fragmentary sectional view showing a housing structure according to a fourth embodiment. Referring to the figure, the valve housing 6 and the pinion housing 11 are both formed of magnesium alloy. Subsequent to the chromate treatment, the valve housing 6 and the pinion housing 11 each have at least an outside surface thereof coated with a rubber-base or an epoxy resin-base paint. The bolt 51 and the spring washer 52 are the same with those of the second embodiment hereof. The bolt 51 is engaged with the female-screw portion 11a of the pinion housing 11. Interposed between the spring washer 52 and the valve housing 6 is a gasket-like seal 58, which is composed of a metal piece coated with a fluorocarbon resin material. Additionally, a seal 59 (a member similar to the seal 58) is interposed between the valve housing 6 and the pinion housing 11.

In the above construction, the valve housing 6 and the bolt 51 formed of metals different from each other are kept out of contact with each other by means of the seal 58 interposed therebetween and hence, there occurs no corrosion. As to the bolt 51 and the pinion housing 11, the bolt 51 is subjected to the aforementioned combination of the chromate treatment and paint coating processing for forming the layers L1 and L2 for insulation, thereby preventing occurrence of corrosion.

Figure 5:
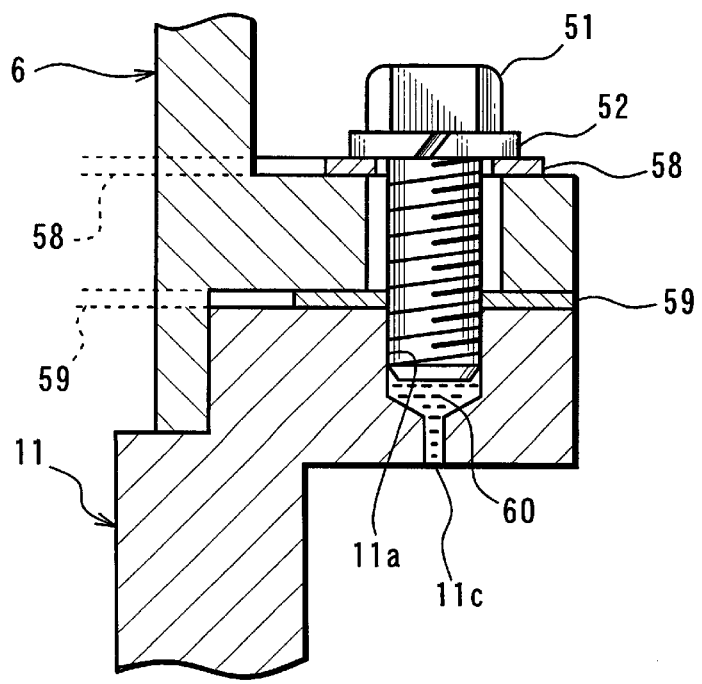
FIG. 5 is a fragmentary sectional view showing an essential portion of a valve housing structure for use in the power steering system in a fifth embodiment of the present invention.
Figure 6:
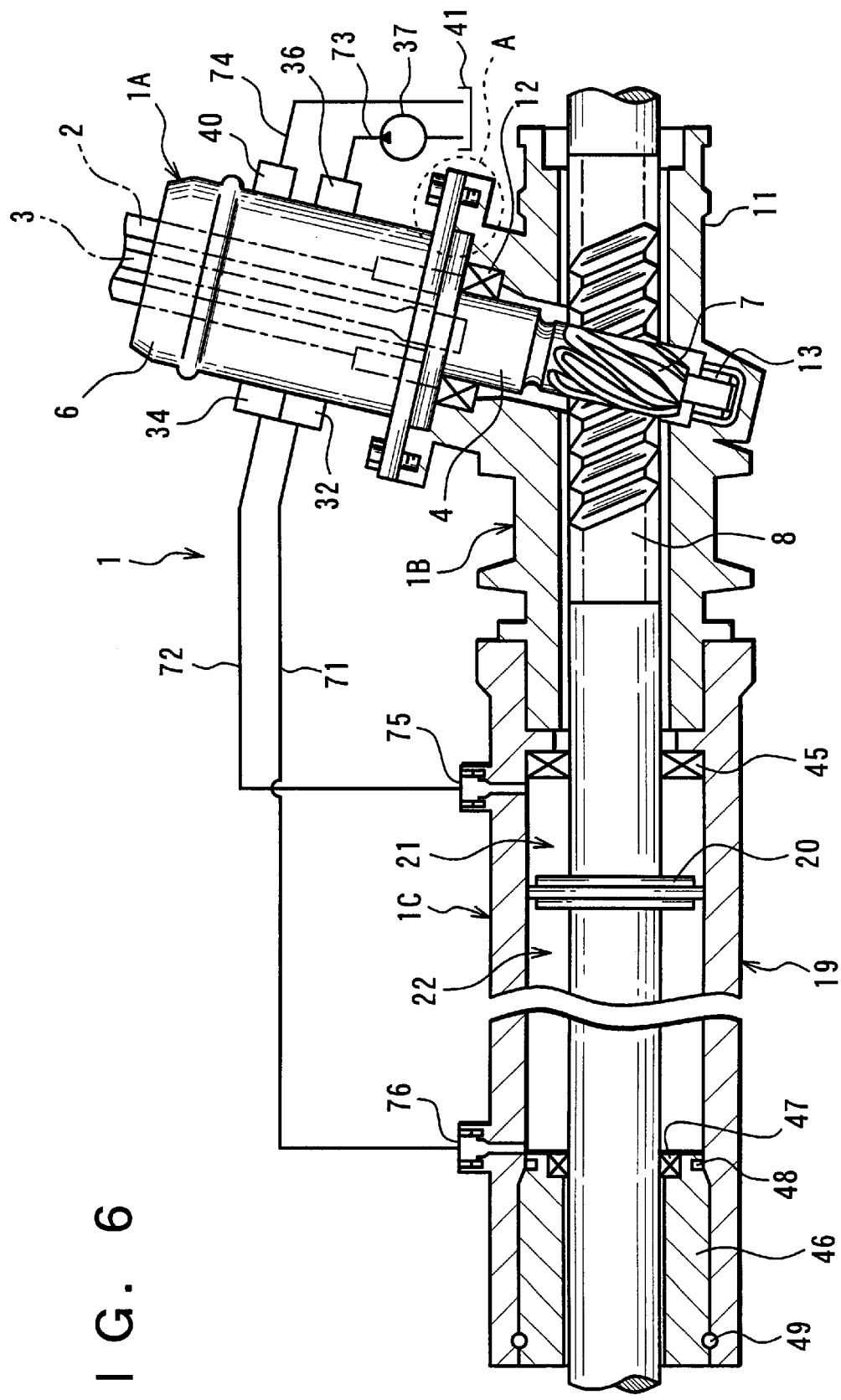
FIG. 6 is a sectional view showing an overall construction of the power steering system.

FIG. 5 is a fragmentary sectional view showing a housing structure according to a fifth embodiment. The structure of this embodiment is the same as that of the fourth embodiment except for that a hole 11c extends from a bottom of the female-screw portion 11a of the pinion housing 11.

In assembly of this structure, an adhesive as a sealing agent is filled in the female-screw portion 11a. The pinion housing 11 is chromate treated as aforementioned. In a dipping process for treating the housing with a chromate liquid, the liquid or air may remain within the female-screw portion 11a. It is preferred to remove the remaining liquid or air which may cause unevenness in the chromate layer formed on the housing. The hole 11c vertically extends from the bottom of the female-screw portion 1a through the pinion housing to discharge the aforementioned liquid, air and a part of adhesive from the female-screw portion. A usable adhesive is of an anaerobic curing type, such as an acrylic resin. Accordingly, inserting the bolt 51 extrudes uncured adhesive from the hole, while the adhesive 60 remaining in the female-screw portion 11a is anaerobically cured to serve for the prevention of corrosion of the thread portion. Additionally, the hole 11c is so small in size that the adhesive 60 is also allowed to cure in the proximity of an exit of the hole 11c. This closes the hole 11c, thereby preventing salt water or the like from entering the female-screw portion 11*a* through the hole 11*c*.

What is claimed is:

1. A power steering housing comprising:

a valve housing formed of one of metal and resin material;

a pinion housing formed magnesium alloy;

a metal bolt for fastening said valve housing and said pinion housing to each other; and an insulating portion interposed in a joint portion between said pinion housing and a metal member adjacent thereto including at least one of said valve housing and said metal bolt, said metal member being formed of a different type of metal from a type of metal the pinion housing is formed of, said insulating portion being formed on a surface of said metal member by applying thereto at least a paint coating layer as a top coat layer formed by epoxy-base paint.

* * * * *